Figure 1:
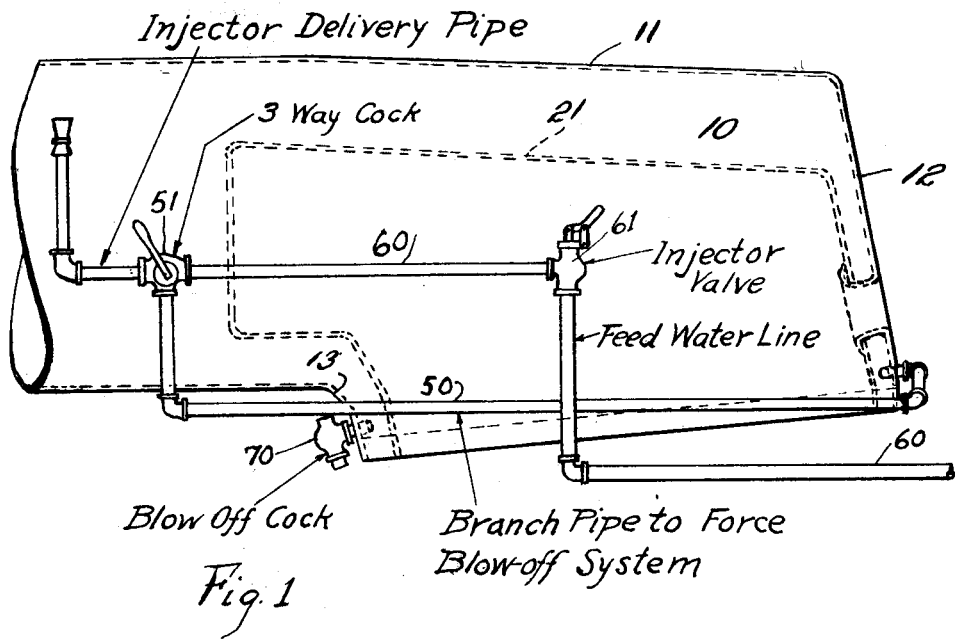

Dec. 18, 1928.

C. A. KOTHÉ

1,696,005

MEANS FOR REMOVING SLUDGE FROM BOILERS

Filed April 28, 1924   4 Sheets-Sheet 1

INVENTOR
Charles A. Kothé,
By Baker, Macklin, Goodrich & Teare
ATTYS

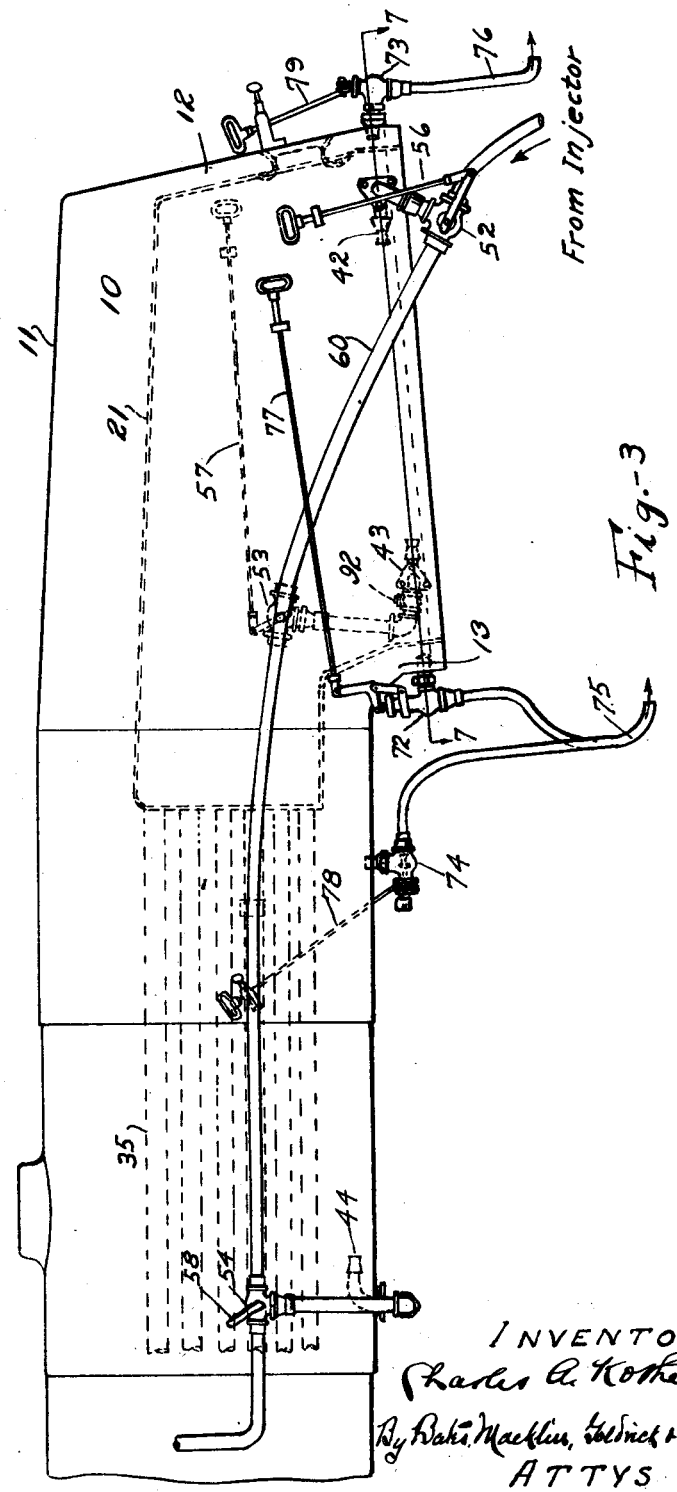

Dec. 18, 1928.                                          1,696,005
C. A. KOTHÉ
MEANS FOR REMOVING SLUDGE FROM BOILERS
Filed April 28, 1924          4 Sheets-Sheet 3
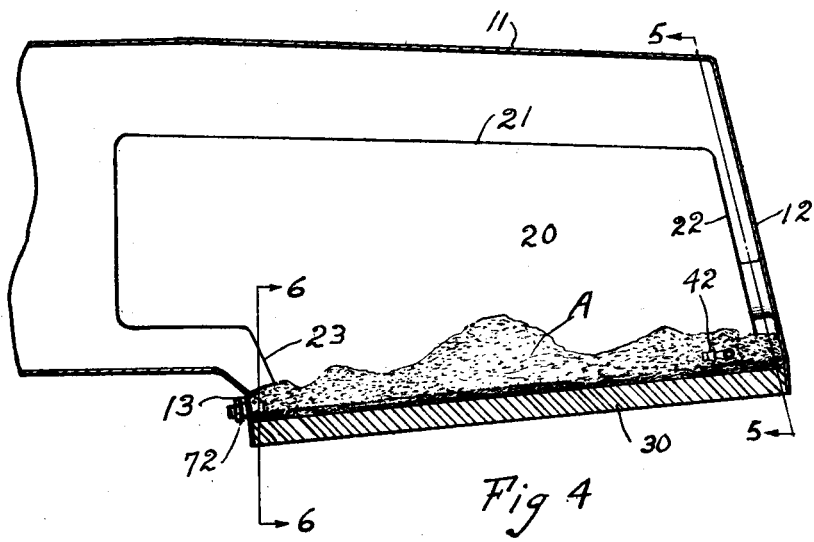
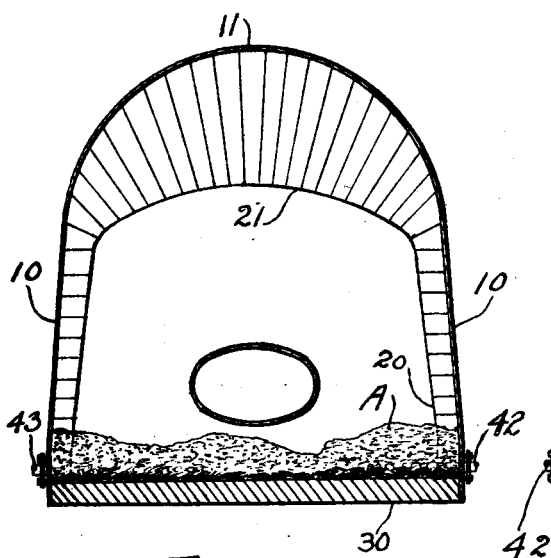
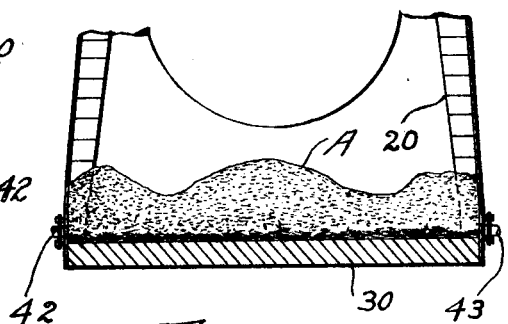

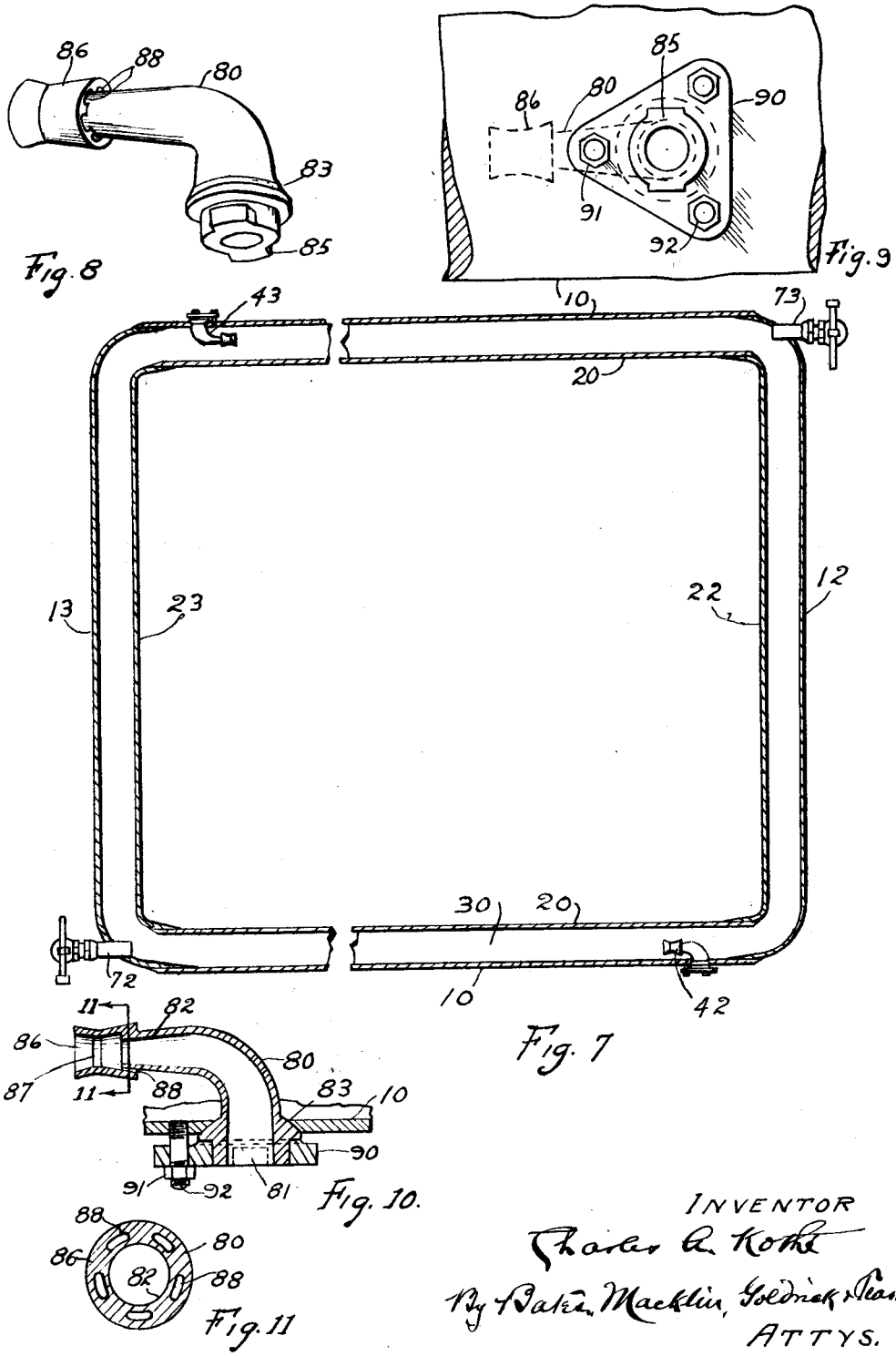

Patented Dec. 18, 1928.

1,696,005

UNITED STATES PATENT OFFICE.

CHARLES A. KOTHÉ, OF MEADVILLE, PENNSYLVANIA.

MEANS FOR REMOVING SLUDGE FROM BOILERS.

Application filed April 28, 1924. Serial No. 709,691.

The object of this invention is to provide an effective blow-off system for removing the sludge, foreign matter and concentrated solutions from steam boilers by means of the steam pressure within the boiler, thus obviating the necessity of frequently withdrawing the fire and washing out the boiler. My invention is particularly well adapted for locomotives and boilers of locomotive type, where there is a water leg in which the sludge and impurities, such as sand, mud, scale, etc., tend to accumulate. The term sludge as used herein is intended to include all such accumulation.

In locomotives using water which needs a softening treatment, as for example, by the soda ash process, a large amount of sludge is deposited in the water leg about the sides and ends of the fire box. This sludge not only seriously interferes with the efficiency of the boiler, but unless care is taken for its frequent removal, it will rise to a dangerous height, resulting in injury to the fire box, sometimes causing explosion. Accordingly, it is customary to frequently blow-off locomotives, when depositing such sludge, by means of opening a blow-off valve just above the mud ring and allowing the steam pressure to force out the adjacent deposit. It has been demonstrated, however, that such method is not effective, because it operates only to remove the sludge immediately around the entrance to the blow-off cock; for as soon as sufficient sludge is thus removed to provide a passageway, a water column is established from the top of the boiler, or directly from the water supply to the boiler, should the injector or pump be in use at the time, and thus water alone, or with comparatively little sediment in suspension, is thereafter discharged. Accordingly, great mounds of sludge are left at the intermediate portions of water leg, and the only feasible method heretofore used for removing this has been to withdraw the fire and wash out the leg with water under pressure.

On the other hand, to force a current of cold water from the supply through the water spaces around the fire box and break up the sludge mound mentioned, while it might be effective in removing the sludge, it would be disastrous to the fire box sheets and tubes by suddenly cooling them.

I have developed a blow-off system by which I can remove substantially the entire sludge as effectively as if such stream of water under pressure were introduced and without danger to the fire box. By my system, I force water into the water leg toward an open blow-off cock and automatically heat such water in its passage, so that it carries the sludge along the mud ring and out through the blow-off cock, and, at the same time, does not injure the fire box sheets. I accomplish this by providing nozzles, located in the water leg and directed toward suitable blow-off openings, which nozzles are adapted to be connected with the main supply pipe and are arranged with restricted orifices to hold back the discharge, so that the water will take up heat from the steam, discharged by the injector.

In addition to the heat, derived from the injector steam, (or as a substitute for it if a supply pump be used) some of the hot water from the water leg is gathered up with the water entering from the supply, by a peculiar sleeve construction about the nozzle orifice, so that a stream of hot water is shot along the mud ring, or a short distance above it, toward the open blow-off cock. In this manner, I forcibly eject the sludge without damage to the fire box.

I prefer to connect the nozzles by three-way cocks with the main supply pipe. In ordinary running, these cocks shut off the pipes to the nozzles, leaving the supply pipe undisturbed; but, whenever it is desired to blow-off, it is only necessary to give the three-way cock a quarter turn to direct the incoming flow to the nozzle, and to open the corresponding blow-off cock, which emits the sludge projected by the stream through that nozzle. If desired, the valve and cocks may be operated, by suitable links and levers, from the cab of the locomotive.

The drawings illustrate my invention, both diagrammatically and in an improved embodiment for one type of locomotive boiler, but it should be understood that I do not intend to limit myself to the particular embodiment or type of boiler shown. My invention is more fully described in connection with these drawings and its essential characteristics are summarized in the claims.

Figure 2:
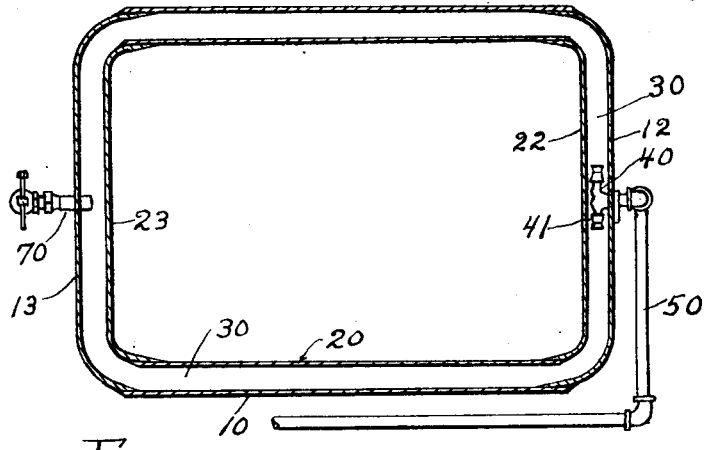

In the drawings, Fig. 1 is a somewhat diagrammatic side elevation of a portion of a boiler of a locomotive type, equipped with my blow-off apparatus. Fig. 2, is a horizontal section thereof through the water leg; the installation here shown, comprising of one double discharge nozzle and a single blow-off cock. Fig. 3 is a side elevation of a preferred embodiment of the invention on a usual modern type of locomotive boiler. Fig. 4 is a sectional side elevation within the water leg of such boiler. Figs. 5 and 6 are substantially upright sections within the water leg at the back and throat of the boiler, as indicated by the lines 5—5 and 6—6 on Fig. 4 respectively. Fig. 7 is a horizontal section through the water leg of such boiler on a larger scale, this view being intermediately broken away. Fig. 8 is a perspective of one of the elbow nozzles, employed in the embodiment of Fig. 3. Fig. 9 is a side elevation of a portion of the water leg, showing such nozzle attached. Fig. 10 is a horizontal section through such nozzle. Fig. 11 is a vertical section on a larger scale across the discharge portion of a nozzle shown in Fig. 10, in the region indicated by the line 11—11 on that figure.

Referring first to the simpler embodiment of Figs. 1 and 2, 10 indicates the sides of the boiler, 11 the roof thereof, 12 the back, 13 the throat. The sides of the fire box are designated at 20, the crown sheet 21, the back 22 and the throat 23. The sides, back and throat sheets of the boiler are connected with the corresponding sheets of the fire box by the quadrangular mud ring 30.

Figs. 1 and 2 show a double nozzle 40, lying in the water leg between the back sheets 12 and 22 and projecting in opposite directions. This nozzle has restricted orifices as hereinafter described, surrounded by sleeves 41, supported by a nozzle, but spaced at intervals from it. The double nozzle is in communication with a pipe 50, leading to a three-way cock 51 on a main feed water line 60, which leads from the tender or other source of supply (not shown) and is provided with suitable means for forcing the water into the boiler, as for instance, the injector 61. The blow-off cock, designated at 70, may be of any usual type, and, in this instance, is located in an intermediate region at the throat of the water leg.

Mounds of sludge, such as indicated at A, in Figs. 4, 5, and 6, may accummulate in the water leg. Now, with the ordinary blow-off system, if the cock 70 were open, only the sludge immediately adjacent thereto, would be removed. In my system, however, when the cock 70 is opened and the three-way valve 51 turned to cause the injected water to enter the nozzle 40, streams of water are projected forcibly from the nozzle, around two sides of the water leg just above the mud ring and mechanically carry the sludge along, discharging it through the blow-off cock. The restriction of the nozzle holds back the flow from the injector proper, so that more of the injector steam is condensed and thus heats the water before it reaches the nozzle, and, at the same time, the contracted sleeve 41 allows hot water in the leg to be picked up by the injected water and carried with it, thus augmenting the heat of such injected water. This nozzle action will be more apparent from the description hereinafter given of the preferred nozzle, as illustrated for example in Figs. 8 and 10.

Referring now to Figs. 3 to 11 inclusive, the boiler shell, fire box and mud ring are designated by the same numerals as heretofore used. In this instance, however, I have mounted a number of nozzles, each connected by a three-way valve with the main feed pipe from an injector not shown. Thus in the water leg, is a nozzle 42 at the side adjacent the back of the boiler and projecting forwardly; a nozzle 43 at the opposite side, adjacent the throat, and projecting toward the back of the boiler, and beneath the flues 35, a nozzle 44 projecting toward the fire box. For each of these nozzles I provide, in this embodiment, a corresponding blow-off cock, namely, the blow-off cock 72, adjacent the throat for the sludge from the nozzle 42, a blow-off cock 73, adjacent the back for the sludge from the nozzle 43, and a blow-off cock 74 under the shell for the discharge nozzle 44.

I have shown the blow-off cocks 72 and 74 connected by branches to a discharge pipe 75, and the blow-off cock 73 coupled to a discharge pipe 76. Suitable links and levers 77, 78 and 79, leading to convenient points, provide for the ready opening of the blow-off cocks whenever desired. The nozzles 42 and 44 are shown as connected respectively with the three-way valves 52 and 54 in the main supply pipe 60 shown, while the nozzle 43 is connected with the three-way valve 53 in the corresponding supply pipe on the opposite side of the locomotive. The valves 52 and 53 are shown as provided with levers and pull rods 56 and 57 for their ready operation from the cab; the valve 54 is shown as having simply a handle 58.

Referring now particularly to Figs. 8 to 11 inclusive, the nozzle there shown, comprises an elbow 80 of gradually reduced bore from its entrance 81 to its primary discharge orifice 82. The shank of the elbow is provided with an external enlargement 83 which is conical or spherical and thus may readily seat in a corresponding opening in the boiler wall 10 as indicated in Fig. 10. Such nozzle may be held firmly in place by a plate 90, surrounding the shank of the nozzle and drawn toward the boiler wall by nuts 91 on studs 92. The shank of the nozzle is of non-circular form (provided preferably by the lugs 85) which by occupying a corresponding opening in the plate 90 prevents the nozzle from turning when in place.

The construction at the discharge end of the nozzle is an important factor as shown in Figs. 8, 10, and 11. A sleeve 86 surrounds the orifice 82 and is internally restricted at 87 and then flares to the final orifice. Suitable openings 88 extend in the general direction of the flow about the point of the nozzle and into the sleeve. The nozzle and sleeve are preferably one integral casting and the openings 88 are made through the junction-portion of the two. The high velocity of the injected water will cause the pressure within the sleeve and adjacent the openings 88 to be less than the boiler pressure, and thus boiler water will be drawn in through these openings, forming an envelope of hot water about the injected stream of feed water.

It will be noted that the opening through the boiler wall, occupied by the annular shoulder 83 on the nozzle, is of greater diameter than any portion of the nozzle or sleeve within the water leg. Accordingly, the nozzle may be readily inserted from the outside and may be tightly held in place by simply employing the plate 90 and the studs and nuts. The removal of these parts allows the removal of the nozzle for purposes of inspection and cleaning.

At all the points of projecting the nozzles through the boiler space, the usual check valves such as indicated at 92 are provided as required by law. The points of discharge are controlled by blow off cocks 72, 73 and 74, as described meeting the necessary requirements.

It will be seen that my blow-off system requires very little additional mechanism and may be readily applied to existing boilers. The nozzles operate to enable forcible streams of hot water to be shot along the mud ring, and experience has demonstrated that such operation effectively removes the sludge. I am thus enabled to increase the efficiency of the boiler operation by keeping the boiler leg clean, and reduce the expense of maintenance by very greatly lengthening the periods between washings.

I claim:

1. The method of removing sludge from boilers under pressure comprising heating a stream of water by passing it through a conduit disposed within the boiler, injecting the stream into a surrounding envelope of hot boiler water before releasing it from said conduit and then projecting the stream with its envelope into the region of the sludge and toward an open blow-off cock while the stream is heated sufficiently to not injure the hot boiler sheets.

2. A method of removing sludge from boilers comprising forcing water into a heat transmitting conduit in heat exchange relation with the hot boiler water and heating the conduit water thereby, injecting the conduit water into a surrounding envelope of hot boiler water before discharging it from the conduit and projecting the hot mixture at the sludge in the direction of a blow-off cock.

3. The combination of a boiler and a tubular elbow passing through the wall thereof, a sleeve on the outlet end of said elbow and provided with passageways communicating with the exterior of said elbow and the channel therein, an annular shoulder on the elbow shank on the outer face of the wall, a plate embracing the shank and bearing against the shoulder, and means for drawing the plate toward the boiler wall to clamp said shoulder against the wall, the hole through the wall having a greater diameter than the external diameter of the sleeve or the elbow between the sleeve and the shoulder.

4. In combination with a boiler having a water leg, a blow-off conduit leading from the water leg, an elbow nozzle having an outlet directed toward said conduit and having means for securing the shank of the elbow to the outer wall, said means comprising an annular shoulder on the shank, a plate embracing the shank and bearing against the shoulder, means for drawing the plate toward the wall to clamp said shoulder against the wall, said means preventing rotation of the plate and said plate and said shank having non-circular interengaging portions whereby the plate prevents the turning of the elbow and maintains it pointing in the direction of the blow-off conduit.

5. The combination with a boiler having a blow-off cock, of an elbow for use in a sludge removing installation having means whereby it may be held in the water space of the boiler, said elbow having a reduced orifice, an integral sleeve surrounding the orifice, there being openings in the general direction of flow but toward the orifice axis through the region between the exterior of the orifice and the interior of the sleeve, said elbow and said sleeve being removable from the boiler through the opening in which the elbow is positioned.

6. The means for removing sludge from boilers comprising the combination with a blow-off cock of a nozzle including in part a conduit disposed within the boiler, said nozzle being located some distance from and directed toward the blow-off cock and being connected with a feed water delivery pipe and having means for forming within the nozzle an envelope of hot boiler water about the injected stream of feed water, whereby the water discharged from the nozzle is heated previous to its discharge.

7. A method of removing sludge from boilers comprising forcing the water into the boiler by means of a steam injector, thereby heating the water by the injector steam, conducting the heated water into the water space of the boiler through a heat transmitting conduit disposed in said space, thereby further heating the water, creating an envelope of hot boiler water about the injected water before discharging it from the conduit, and projecting the heated injected water with its envelope through a restricted orifice at high velocity at the sludge and toward a blow-off cock.

8. The combination with a boiler, of a blow-off cock connected thereto, an elbow extending through the boiler shell and having a nozzle in the water space directed toward the blow-off cock, the nozzle having a reduced orifice and having a sleeve surrounding its orifice and spaced therefrom with entrance passageways between them, the sleeve having its bore gradually restricted and then flaring toward its orifice, and an external flange on the elbow coacting with an opening in the shell of greater size than the exterior of the nozzle and sleeve, whereby said nozzle and sleeve are removable as a unit through the opening in the boiler wall.

In testimony whereof, I hereunto affix my signature.

CHARLES A. KOTHÉ.